United States Patent Office 3,058,942
Patented Oct. 16, 1962

3,058,942
POLYVINYL CHLORIDE HOMOGENIZED WITH TRIISOBUTYL TRIMESATE AND METHOD OF PREPARATION
Earl V. Kirkland and Robert J. Lee, La Marque, Tex., and Robert F. Smith, Park Forest, Ill., assignors, by mesne assignments, to Standard Oil Company of Chicago, Ill., a corporation of Indiana
No Drawing. Filed July 7, 1958, Ser. No. 746,587
5 Claims. (Cl. 260—31.8)

This invention relates to polyvinyl chloride compositions and to an ingredient, namely, triisobutyl trimesate, useful in such compositions.

Due to the corrosion resistant properties of rigid polyvinyl chloride, this material is being widely used in preformed shapes. Rigid polyvinyl chloride pipes are used for carrying chemicals, sour crude oils and the like. This material is used in forming containers, fume hoods, fittings, valves, ducts, etc. for use in chemical plants. The polyvinyl chloride is formed into the desired shapes by extrusion, molding, or calendering at elevated temperatures in the neighborhood of 300–400° F. Even at such elevated temperatures it is difficult to process the polyvinyl chloride into the finished form, rough surfaces, incomplete fusion of particles and similar difficulties often occurring. While various plasticizers have been added to the polyvinyl chloride to make processing of the latter much easier, the plasticizers that have been added make the rigid polyvinyl chloride too flexible for uses for which they were originally intended such as rigid pipes, valve fittings, etc.

An object of the present invention is to provide a novel compound which renders polyvinyl chloride more easily processed into finished shapes. Another object is to provide a processing aid for rigid polyvinyl chloride which do not greatly reduce the stiffness or non-flexibility of rigid polyvinyl chloride. A further object is to provide a processing aid for polyvinyl chloride which does not drastically reduce the impact resistance of the polyvinyl chloride. These and other objects of the invention will be apparent from the detailed description thereof.

It has been found that triisobutyl trimesate has the above advantages when homogenized or blended with solid polyvinyl chloride. In accordance with the invention, solid polyvinyl chloride such as may have a molecular weight within the range of 25,000 to 250,000 is homogenized with a lesser proportion of triisobutyl trimesate. The amount of the triisobutyl trimesate will generally be from 5 to 30 parts per 100 parts by weight of polyvinyl chloride. The resultant homogenized mixture is much more readily processed into the finished form desired, and inclusion of the triisobutyl trimesate does not adversely affect stiffness nor does it seriously reduce the impact resistance of the polyvinyl chloride.

The solid polyvinyl chloride into which the triisobutyl trimesate is incorporated are homopolymers of vinyl chloride. The triisobutyl trimesate may be incorporated into any of the conventional or commercial rigid polyvinyl chlorides that are used where corrosion or chemical action is a problem, or in rigid polyvinyl chloride that is used for forming articles such as refrigerator parts, luggage, advertising and highway signs, housing, etc. where corrosion is not a problem but rigidity is necessary. The higher molecular weight polyvinyl chlorides are used for such purposes. It may also be incorporated into lower molecular weight polymers of polyvinyl chloride which are used in making phonograph records, vinyl-asbestos floor tiling, etc. Polyvinyl chlorides having a molecular weight of 25,000 to 250,000 e.g. 50,000 to 150,000 are examples of the type of polyvinyl chloride into which the triisobutyl trimesate may be incorporated. Examples of commercial polyvinyl chlorides into which the triisobutyl trimesate may be blended are Geon 101, 103, 404; Exon 402A, 450, 8700 series e.g. 8750 and others.

The triisobutyl trimesate is milled with the polyvinyl chloride powder or particles to form a homogeneous composition. Conventional milling or mixing techniques can be used to obtain this intimate mixture. It is often customary to add a stabilizer, lubricant, and pigment which are then blended into the polyvinyl chloride during the milling operation. The milling step is usually carried out at an elevated temperature e.g. 300° F. or somewhat higher. Thereafter the milled composition is formed into the desired shape by extrusion, molding, or calendering, usually at an elevated temperature. Because of the presence of the triisobutyl trimesate in the polyvinyl chloride, the polyvinyl chloride particles will fuse together more readily and will flow more easily during this shaping operation. The shaped product will have a smoother surface and fewer faults. The easier processability that is attributable to the triisobutyl trimesate often enables the processing step to be carried out at a somewhat lower temperature than is customary.

Since the triisobutyl trimesate enables much easier processing during the shape forming operation, it may be considered as a processing aid. While it is compatible with polyvinyl chloride and thus satisfies one definition of a plasticizer, it does not function like ordinary plasticizers which make the plasticized product soft and flexible at ordinary room temperatures. The polyvinyl chloride containing triisobutyl trimesate is hard and horny at room temperatures. Triisobutyl trimesate appears to be unique, among the other esters of trimesic acid, with respect to not substantially reducing the stiffness and impact resistance of the polyvinyl chloride. The polyvinyl chloride is milled with the triisobutyl trimesate using amounts of the latter which are less than the amount of polyvinyl chloride by weight. The triisobutyl trimesate may be present in the milled composition in an amount between about 5 and 30 parts by weight per 100 parts by weight of the polyvinyl chloride. Somewhat lesser or larger amounts than the range expressed may be used.

Evaluations were carried out which enabled comparisons to be made between a rigid polyvinyl chloride composition and a rigid polyvinyl chloride composition containing triisobutyl trimesate. Geon 101 was employed as the rigid polyvinyl chloride material. 100 parts by weight of the Geon 101 particles were milled with 3 parts by weight of a stabilizer (Vanstay 16) and 0.1 part by weight of stearic acid as a lubricant and mold release. The same components in the same amounts were milled in a different operation together with 15 parts by weight of triisobutyl trimesate. Test samples of the two formulations were then molded at 330° F. under a pressure of approximately 700 p.s.i. The Geon 101 sample containing triisobutyl trimesate appeared to flow better in the mold and produced smoother sheets than did the Geon 101 sample which contained no triisobutyl trimesate. The two samples were then evaluated in a series of tests to determine their stiffness and impact resistant properties. Results are shown in Table I which follows.

Table I

| Sample | Impact Resistance (ft.) [1] | Stiffness lbs./in.$^2$ ASTM D-747-50 |
|---|---|---|
| A—Geon 101 | 4.5 | 25.2×10$^4$ |
| B—Geon 101+T.I.B.T | 4.0 | 25.3×10$^4$ |

[1] Maximum height from which a 533 gram steel ball can be dropped onto a 6 in. square sample without shattering the sample.

The impact resistant properties of the samples were covered in terms of feet. The test was carried out by dropping a 533 gram steel ball on a six inch square sample supported on three steel balls spaced equidistant on the circumference of a five inch diameter circle. The ball was dropped from a given height. If the sample did not shatter, the height for the next drop was increased by six inches, and the testing proceeded until the maximum height was determined at which a sample would not shatter.

It is evident from the results reported in Table I that Sample B which contained the triisobutyl trimesate displayed approximately the same stiffness and impact resistance as did the rigid polyvinyl chloride which contained no triisobutyl trimesate. This is quite unusual since other plasticizers reduce the stiffness and impact resistance when added to the rigid polyvinyl chloride.

A series of formulations were prepared containing 253 parts by weight of Vinylite VYNW-5 (copolymer of vinyl chloride with vinyl acetate), 4.8 parts of basic lead carbonate, 2 parts of stearic acid, and 140 parts of a plasticizer. Various plasticizers including dioctyl phthalate, tri-n-butyl trimesate, triisobutyl trimesate and triisoamyl trimesate were evaluated. The ingredients were milled at 310° F. and the homogeneous milled products were molded at 320° F. under about 10,000 p.s.i. pressure. The results of the evaluation are shown in the following table.

Table II

| Processing Aid | DOP | Tri-n-butyl Trimesate | Triisobutyl Trimesate | Triisoamyl Trimesate |
| --- | --- | --- | --- | --- |
| Tensile Strength, lbs./in.² | 2,540 | 2,740 | 2,870 | 2,780 |
| 100% Modulus, lbs./in.² | 1,110 | 1,440 | 2,150 | 2,070 |
| Hardness, Shore "A" | 71 | 75 | 97 | 85 |

It is apparent from the above table that the shore "A" hardness of the molded product was greatest when triisobutyl trimesate was used as the processing aid. It was harder than the molded product obtained when the other very similar trimesate esters were employed, and substantially greater than that in which dioctyl phthalate was used. Because there is a relationship between hardness and flexibility i.e. the greater the hardness the less flexible is the product, the triisobutyl trimesate is unique among the other trimesate esters in functioning as a processing aid while not substantially reducing the stiffness of the polyvinyl chloride.

Thus having described the invention, what is claimed is:

1. A composition of matter comprising essentially a rigid polyvinyl chloride homogenized with a lesser proportion of triisobutyl trimesate.

2. The composition of claim 1 wherein said polyvinyl chloride has an average molecular weight within the range of 25,000 to 250,000.

3. The composition of claim 1 wherein said triisobutyl trimesate is present in said composition in an amount between about 5 and 30 parts per 100 parts by weight of polyvinyl chloride.

4. A composition comprised essentially of rigid polyvinyl chloride having an average molecular weight within the range of 25,000 to 250,000 homogenized with from 5 to 30 parts of triisobutyl trimesate per 100 parts by weight of said polyvinyl chloride.

5. In the preparation of rigid polyvinyl chloride articles the steps comprising milling rigid polyvinyl chloride having a molecular weight in the range of 25,000 to 250,000 with from 5 to 30 triisobutyl trimesate per 100 parts by weight of said polyvinyl chloride, a lubricant, and a stabilizer and shaping the resulting composition at elevated temperatures under pressure.

References Cited in the file of this patent

UNITED STATES PATENTS 2,507,509     Fegley et al. _____ May 16, 1950
2,650,908     Beears _____ Sept. 1, 1953